United States Patent Office 3,413,232
Patented Nov. 26, 1968

3,413,232
HEAT-REACTION PRODUCT COMPRISING BARIUM OR MOLYBDENUM SULFIDES, METAL PHOSPHATES AND METAL DIOXIDES
Frederic R. Quinn, Red Hook, N.Y., assignor to Zyrotron Industries, Inc., Red Hook, N.Y., a corporation of Delaware
No Drawing. Continuation-in-part of application Ser. No. 347,681, Feb. 27, 1964. This application June 1, 1967, Ser. No. 642,716
23 Claims. (Cl. 252—301.1)

ABSTRACT OF THE DISCLOSURE

Inorganic heat-reaction products are produced by heating a mixture of certain specified ingredients (in comminuted form) in a non-oxidizing atmosphere, preferably nitrogen, at about 1300°–1800° F. for a period sufficient to produce a sintered mass. The components of the mixture are: (A) barium sulfide and/or molybdenum disulfide; (B) at least one of the following: phosphates of aluminum, antimony, barium, calcium, iron, magnesium and zinc; (C) one or more of the dioxides of hafnium, thorium, uranium and zirconium; and, optionally, (D) chromic oxide.

---

The inorganic heat-reaction products are especially useful when admixed with a carrier (e.g., an organic carrier) in weight percentages of 10:90 to 90:10, preferably from 40:60 to 60:40. The chosen carrier may be reactive or nonreactive with the heat-reaction product. Examples of carriers are the polyesters, the organopolysiloxanes, the polyethylene glycols and the alkyl-substituted phosphoric acids.

Detailed properties are given of a representative sample of an exemplary composition. Comparative data also are given of a composition made into a small valve plug, and wherein in one case the heat-reaction product had been formed by firing the starting components in air, and in the other case in an atmosphere of nitrogen. Firing in nitrogen gave better results.

Disclosed uses of the compositions include, for example applications involving encapsulation; in forming hermetic seals; as adhesives, e.g., in bonding glass to metals; in forming molded articles; and in laminating applications. The hardenable or hardened compositions are useful, for instance, in applications where epoxy resins are presently employed, or in other applications wherein epoxy resins are unsuitable or unsatisfactory because of certain deficiencies, e.g., thermal resistance and electrically insulating properties.

This application is a continuation-in-part of my copending application Ser. No. 347,681, filed Feb. 27, 1964, allowed Mar. 14, 1967, now abandoned, and assigned to the same assignee as the present invention.

This invention relates to new and useful compositions of matter. More particularly the invention is concerned with compositions having particular and peculiar properties that make them eminently suitable for use in industry. For example, the various compositions of this invention are useful in applications involving encapsulation; in forming hermetic seals; in making molded articles; and as adhesives, e.g., in bonding glass to metals such as steel (including stainless steel), nickel and alloys thereof such as nickel-chromium alloys, aluminum, etc. Other uses are mentioned hereafter. The scope of the invention also includes novel inorganic heat-reaction products that are used in preparing compositions of the instant invention; and, also, method features.

Briefly described, one class of compositions of the present invention comprises (1) a heat-reaction product of (a) at least one member of the group consisting of barium sulfide and molybdenum disulfide, (b) at least one member of the group consisting of the phosphates of aluminum, antimony, barium, calcium, iron, magnesium, uranium and zinc, and (c) at least one member of the group consisting of the dioxides of hafnium, thorium, uranium and zirconium, and (2) a carrier, more particularly an organic carrier, for the said heat-reaction product. Another class of compositions of this invention differs from the above-described class in that the heat-reaction product of (1) is the heat-reaction product of the ingredients of (a), (b) and (c), supra, and, in addition, (d), chromic oxide, $Cr_2O_3$. Compositions of this latter class are particularly useful in adhesive, bonding, sealing, laminating and similar applications wherein a composition having optimum adhesive or bonding characteristics is desired. In the compositions of both classes the carrier may be one which is reactive, potentially reactive or non-reactive with the aforesaid heat-reaction products. Optimum results have been obtained when there is used a carrier which is reactive (or potentially reactive) with the chosen heat-reaction product.

The weight percentage proportions of heat-reaction product and carrier may be adjusted as desired or as may be required in order to obtain a composition of the desired consistency or viscosity, e.g., from 10:90 to 90:10 and, more particularly, from 20:80 to 80:20. The use of higher or lower weight percentage proportions is, of course, not precluded. Depending upon the viscosity desired, the particular end-use, the unit weight and other characteristics of the heat-reaction product and of the carrier, the heat-reaction product and the organic carrier are employed in many applications in initial proportions of approximately 50% (±10%) of each.

Examples of carriers, more particularly organic carriers including reactive (e.g., polymerizable) organic carriers, that may be used in practicing the present invention, are polymerizable polyesters and poly(organosiloxanes), i.e., organopolysiloxanes or so-called "silicones." The available evidence also indicates that such compositions which are normally considered to be non-reactive (or substantially non-reactive) in a reaction of the kind with which this invention is concerned are, in fact, reactive with the above-described heat-reaction product. More specific examples of the latter are, for instance, the polyvinyl halide (e.g., polyvinyl chloride, polyvinyl bromide and polyvinyl fluoride) resins within which terminology is intended to be included both homopolymers and copolymers of a vinyl halide, e.g., any of the commercially available vinyl chloride copolymers such as those wherein the comonomer is, for example, vinyl acetate, methyl acrylate, acrylonitrile, and/or other ethylenically unsaturated monomers that are copolymerizable with vinyl chloride and especially those which contain a $CH_2=C<$ grouping.

No pertinent prior art is known. Compositions containing molybdenum sulfide (molybdenum disulfide) and a binder as essential components are disclosed in, for example, U.S. Patents 2,156,803, 2,284,785, 2,860,111, 2,945,770, and 2,951,053.

None of the foregoing or any other known prior art in any way teaches or even faintly suggests the inorganic heat-reaction products involved in the present invention or the compositions of the instant invention that contain such heat-reaction products in a chemically, physically or otherwise combined state or form.

It is a primary object of the present invention to provide a new and useful class of inorganic heat-reaction products. Another object of the invention is to provide a method of making the aforementioned new class of inorganic heat-reaction products.

A further object of the invention is to provide a new class of compositions having a particular combination of properties that makes them especially valuable for industrial and other uses, e.g., wherever epoxy resins are now commonly used.

Still another object of the invention is to prepare compositions that will withstand temperatures of from −60° C. to 220° C. for prolonged periods of time without physical deformation and at even higher temperatures for shorter periods of time.

Another object of the invention is to provide liquid compositions that are useful in, for example, painting, spraying, casting and potting applications and that have a good shelf life, e.g., 6 months at ambient temperature or from 9 months to a year or more at +38° F.

Other objects of the invention will be apparent to those skilled in the art from the following more detailed description and the illustrative examples.

The heat-reaction products of the invention are produced from the following ingredients in, for example, the following ranges of approximate parts by weight:

| | Approx. parts by wt. |
|---|---|
| One or more of the phosphates of aluminum, antimony, barium, calcium, iron, magnesium and zinc | 400–900 (preferably 400–600). |
| Dioxide of hafnium and/or of thorium and/or of uranium and/or of zirconium | 225–600. |
| Barium sulfide and/or molybdenum disulfide | 100–225. |
| Optional: Chromic oxide, $Cr_2O_3$, up to 150, preferably | 50–150. |

Illustrative examples of the phosphates of the aforementioned metals that are useful in making the heat-reaction products of the invention are: aluminum orthophosphate, $AlPO_4$; antimony orthophosphates; the various barium orthophosphates: $Ba_3(PO_4)_2$ (i.e., tri-), $BaHPO_4$ (i.e., di-) and $BaH_4(PO_4)_2$ (i.e., mono-), and barium pyrophosphate, $Ba_2P_2O_7$; the various calcium orthophosphates: $Ca_3(PO_4)_2$ (i.e., tri-), $CaHPO_4 \cdot 2H_2O$ (i.e., di-) and $Ca(H_2PO_4)_2 \cdot H_2O$ (i.e., mono-), and calcium pyrophosphate, $Ca_2P_2O_7$; the various magnesium orthophosphates including the tri-, $Mg_3(PO_4)_2$ with 4 or 8 moles of bound $H_2O$, and the mono-, $MgHPO_4$ with 3 or 7 moles of bound $H_2O$, and magnesium pyrophosphate, $Mg_2P_2O_7$; the various zinc orthophosphates including the tri-, $Zn_3(PO_4)_2$ with no bound water or with 4 or 8 moles of bound water, and the di-, $Zn(H_2PO_4)_2 \cdot 2H_2O$; and zinc pyrophosphate, $Zn_2P_2O_7$; and the iron orthophosphates (ous), $Fe_3(PO_4)_2 \cdot 2H_2O$, and (ic), $FePO_4 \cdot 2H_2O$, and iron pyrophosphate (ic), $Fe_4(P_2O_7)_3 \cdot 9H_2O$. The metaphosphates of the aforementioned metals, e.g., calcium metaphosphate, also can be used. Preferably the triorthophosphates or the pyrophosphates are employed. The di- and monoorthophosphates are operative (the di-derivative being more satisfactory than the monoorthophosphate), since sintering of the comminuted ingredients is effected in a nonoxidizing atmosphere. However, neither seems to give as good results as do the triorthophosphates and the pyrophosphates.

A preferred phosphate is calcium phosphate, more particularly calcium triphosphate (calcium triorthophosphate). Preferably the sulfide is solely molybdenum disulfide.

The particle size (U.S. Standard Sieve Series) of the aforementioned ingredients is of the order of 100-mesh or finer, e.g., 200-mesh or finer, and preferably 300-mesh or finer. If not initially anhydrous, they are rendered anhydrous by suitable heating prior to sintering the admixed ingredients.

The finely divided or comminuted ingredients are mixed thoroughly together in a blender or other suitable mixing device. The resulting mixture is then heated in a non-oxidizing atmosphere (anaerobic), for example an atmosphere of nitrogen, helium, argon or other inert gas, at a temperature and for a period of time sufficient to form a heat-reaction product of the defined ingredients.

The time and temperature of heating to form the aforesaid heat-reaction product are usually such that sintering between the ingredients takes place. Such results, although not limited thereto, are ordinarily obtained by heating the finely divided admixture in a non-oxidizing atmosphere, preferably a nitrogen atmosphere, at a maximum temperature within the range of from about 1300° F. to about 1800° F. (more particularly to about 1650° F.) for from about ⅓ hour to about 18 hours or more depending, for example, upon the sintering temperatures of the particular ingredients employed, their particle size, and other influencing factors. Generally, heating for from about ½ hour to about 1½ hours within the aforementioned maximum temperature ranges (more particularly from 1350° F. to 1650° F.) secures the desired result. Typically, about 10 to 20 minutes is consumed in raising the temperature from about 800° F. to the maximum temperature.

As shown by one of the examples that follows, firing of the mixture of starting components in an atmosphere of nitrogen gives results that are quite different and an ultimate composition that is much better than when the aforesaid mixture is fired in air.

At the end of the above-described heat-reaction period the admixture is in sintered, cake-like form. This heat-reaction product is then pulverized by any suitable means to a powdered form, e.g., a comminuted heat-reaction product having a particle size of the order of 300 mesh or finer.

Evidence of chemical reaction of or interaction between the ingredients employed in making the above-described heat-reaction product is shown by the following: A change of color takes place as compared with the color of the admixture of the original ingredients. Additionally, copious fumes of $H_2S$ are liberated during the reaction. Also, a covered receptacle containing the admixture of powders during heat treatment in a furnace has a layer of sublimed sulfur deposited on the lower portion of the cover, and sublimed sulfur is also deposited throughout the furnace. Furthermore, a product is obtained having different chemical properties as compared with that of the admixture of ingredients. The difference in chemical properties is evidenced by the difference in the chemical reactivity of the heat-reaction product as compared with that of an admixture of the aforementioned ingredients used in its preparation.

The pulverized heat-reaction product is thoroughly admixed by any suitable means with a carrier, more particularly an organic carrier, for the said heat-reaction product, e.g., in a blender or chemical mixer, or by any other suitable means. Ranges of weight ratios of organic carrier and heat-reaction product have been discussed hereinbefore.

With the preferred organic carriers, the heat-reaction product seems to dissolve subsantially completely therein, and there is usually visual indication of chemical reaction between the heat-reaction product and the carrier. Evidence of such reaction is shown by the boiling action of the admixture or solution. Such boiling may continue for a fairly long time, e.g., for from 1 to 2 weeks, before the solution is ready for use in such applications as, for instance, a filler for natural and synthetic rubbers, or for natural and synthetic resins, or for spraying, painting, casting, potting, adhesive, laminating and other applications. The shelf life of a typical liquid composition comprising organic carrier and heat-reaction product is 6 months at room temperature (20°–30° C.) or from 9 to 12 months at about 38° F.

When the organic carrier is, for instance, an unsaturated polyester, e.g., a polyester obtained by reacting a polyhydric alcohol, e.g., ethylene glycol, diethylene glycol, triethylene glycol, glycerol or admixtures thereof in any proportions with an ethylenically unsaturated polycarboxylic acid (within which terminology is included the alpha,beta-ethylenically unsaturated polycarboxylic acids), e.g., maleic, fumaric, itaconic, citraconic, mesaconic, aconitic, etc. (or the anhydrides thereof if available), alone or admixed with a compound containing a $CH_2=C$ grouping, e.g., styrene, dichlorostyrene, acrylonitrile, methacrylonitrile, methyl acrylate, ethyl acrylate, vinyl acetate, vinyl propionate, etc., then the polymerizable admixture is preferably relatively slowly polymerized to a substantially insoluble, substantially infusible state. For example, the polymerizable admixture of organic carrier and comminuted heat-reaction product may be heated at a temperature ranging between about 50° F. and about 500° F., more particularly at about 100° F. to about 450° F., for about 8 to about 160 hours or more, specifically about 24 hours. If a polymerization catalyst is to be incorporated into the polymerizable composition, as is ordinarily done, this may be done either prior to, during or after the initial period of heating.

Illustrative examples of poly(organosiloxanes) that may be used as the organic carrier are those wherein the organic radical is a hydrocarbon or a halogenated hydrocarbon radical, for instance alkyl (including cycloalkyl), e.g., methyl through octadecyl, cyclohexyl, cycloheptyl, etc.; alkenyl, e.g., vinyl, allyl, etc.; aryl, e.g., phenyl, diphenyl, naphthyl; aliphatic-substituted aromatic, e.g., tolyl, xylyl, isopropylphenyl, butylphenyl, trimethyl and tetramethylphenyl; and aromatic-substituted aliphatic, e.g., benzyl, phenylethyl, phenylpropyl, phenylisopropyl; and the nuclearly halogenated and/or the sidechain halogenated (e.g., chlorinated, brominated, fluorinated) hydrocarbon radicals corresponding to those hydrocarbon radicals given hereinbefore by way of illustration.

Other examples of organic carriers that may be used in practicing the present invention are the various commercially available glycols, e.g., ethylene glycol, diethylene glycol, triethylene glycol, tetraethylene glycol, pentaethylene and the higher alkylene glycols, and the various available glycol ethers including, e.g., glycol monomethyl ether, glycol monoethyl ether, glycol monobutyl ether, gycol monobenzyl ether, the various glycol monoesters including, for example, the glycol monoesters of oleic, stearic and palmitic acids, and other glycol ethers and esters that will be apparent to those skilled in the art from the foregoing illustrative examples.

Illustrative examples of other organic carriers that may be employed are, for instance, the various organic phosphorus compounds, more particularly the various organic phosphoric acids produced and sold by Monsanto Chemical Company, St. Louis, Mo., as for example, Alcaphose A and Alcaphose C No. 261–J–29 and which are understood to be alkyl-substituted, and specifically methyl-substituted, phosphoric acids. The various ethyl-, propyl-, butyl- and other alkyl-substituted phosphoric acids also may be used.

In general, the organic carriers used in practicing the present invention are those with which the heat-reaction product is reactive, e.g., as a cross-linking agent. Thus, with some organic carriers, e.g., organic plastic materials, the heat-reaction product may function as a cross-linking agent for the said plastic material; as an esterification catalyst; or as a conjoint esterification catalyst and cross-linking agent. With others, the heat-reaction product may react with the organic plastic material, e.g., a polyvinyl halide composition, to effect what appears to be a vulcanization of the said polyvinyl halide composition. In other cases, and/or in conjunction with a chemical reaction, the inorganic heat-reaction product may be dissolved (as has been indicated hereinbefore) in the organic carrier in "true" solution or in solid state.

Illustrative examples of polymerization catalysts that may be incorporated into organic carriers comprising polymerizable compositions that may be used in practicing this invention are, for example, the peroxy compounds and other polymerization accelerators described in, for example, U.S. Patent No. 2,818,362, dated Dec. 31, 1957. Such catalysts include, e.g., dialkyl peroxides, e.g., dilauryl peroxide, di(tert.-butyl)peroxide, etc.; the alkyl hydroperoxides, e.g., tert.-butyl hydroperoxide, tert.-amyl hydroperoxide, etc.; the symmetrical diacyl peroxides, e.g., acetyl peroxide, stearoyl peroxide, benzoyl peroxide, etc.; the unsymmetrical or mixed diacyl peroxides, e.g., acetyl benzoyl peroxide, etc.; terpene oxides, e.g., ascaridole, etc.; peracids, e.g., perbutyric acid, etc.; persalts, e.g., the ammonium and alkali-metal persulfates, and the sodium and other alkali-metal percarbonates, perborates and perphosphates; and various miscellaneous peroxy compounds, e.g., benzoin peroxide, cumene hydroperoxide and urea peroxide. Other examples of so-called "free-radical" types of catalysts, in addition to the peroxy compounds, include alpha,alpha'-azobisisobutyronitrile and other azo catalysts, numerous examples of which are given in, for instance, U.S. Patent No. 2,882,317 and in Hunt Patent No. 2,471,959 cited therein. Ascorbic acid is a suitable catalyst for use with certain organic carriers used in practicing the present invention, e.g., with organic carriers of the poly(organosiloxane) type and with certain of the organic carriers of the polyester type, e.g., Hetron 42 polyester resin produced and sold by Hooker Chemical Corporation, Niagara Falls, N.Y.

Where time is immaterial or unimportant, the catalyst may be omitted during the period of contact of the inorganic heat-reaction product and polymerizable organic carrier. Obviously, a polymerization catalyst is unnecessary when the organic carrier is of the nonpolymerizable type or kind.

If a catalyst is employed the amount thereof may be considerably varied depending, for example upon the particular catalyst employed, the particular polymerizable (or potentially polymerizable) organic carrier used, and the time, temperature and other conditions of polymerization, as will be readily understood by those skilled in the art. In general, however, the amount of catalyst used is within the range of from about 0.2% to about 8% by weight of the polymerizable organic carrier. Good results have been obtained using the polymerization catalyst in an amount, by weight, corresponding to from about 2% to about 4% by weight of the polymerizable composition.

The liquid compositions of this invention can be applied to electrical apparatus or elements thereof that need to be electrically insulated and, upon hardening, function as electrical insulation for such apparatus or elements. Thus, they can be used in electrically insulating dynamoelectric machines such as motors of all sizes and types; transformers; switchboards; arc-extinguishing tubes; electric-circuit breakers; electrical conductors; and numerous other structures that will be apparent to those skilled in the art from the foregoing illustrative examples.

The compositions of the invention also can be incorporated with other thermal and/or electrically insulating materials to improve the properties of the latter. For example, they can be compounded with such materials as natural rubber and the various synthetic rubbers including polybutadiene, polyisoprene and silicone rubbers; natural and synthetic (both thermoplastic and thermosetting) resins including urea-aldehyde, melamine-aldehyde and phenol-aldehyde resins; vinyl-type polymers such as the various polyalkenes, e.g., polyethylene, polypropylene, etc.; polyacetals; polycarbonates and condensation polymers such as alkyd resins, nylon, etc.; and others that will be obvious to those skilled in the art from these illustrative examples.

In general, the hardenable (heat-curable) or hardened (heat-cured) compositions of this invention are useful in applications where epoxy resins are now commonly used as well as in other applications wherein epoxy resins are unsatisfactory because of inadequate thermal resistance, and/or inadequate electrically insulating properties, and/or deficiencies in other properties needed for the particular application.

In order that those skilled in the art may better understand how the present invention can be carried into effect, the following examples are given by way of illustration and not by way of limitation. All parts and percentages are by weight unless otherwise stated or indicated.

EXAMPLE 1

The following ingredients, each having a particle size of 300 mesh and finer, are thoroughly mixed together:

| | Parts by weight |
|---|---|
| Calcium triphosphate (calcium triorthophosphate) | 452 |
| Zirconium dioxide | 452 |
| Molybdenum disulfide | 143 |
| Chromic oxide, $Cr_2O_3$ | 92 |

The resulting admixture is then heated in a nitrogen atmosphere at about 1500° F. for about 1 hour. The heat-reaction product of the aforementioned ingredients is a sintered, cakeish mass. This mass is broken up and ground to a powder having a fineness of 300 mesh and finer.

The finely divided heat-reaction product, which is capable of undergoing further reaction, is thoroughly mixed by any suitable means, e.g., in a blender, with a reactive organic carrier, e.g., a polymerizable polyester resin produced and sold by Hooker Chemical Corporation, Niagara Falls, N.Y., as Durez No. 70. The heat-reaction product and the polyester resin are admixed in approximately equal parts by weight of each. A chemical reaction takes place as evidenced by the boiling action of the mix. This continues for from about 1 to 2 weeks, after which the liquid composition is ready for use, e.g., in spraying, painting, adhesive, bonding or potting applications (especially where high adhesive or bond strength to a substrate is desired) or in making compositions adapted for these and other uses.

The shelf life of the liquid composition is approximately 6 months at room temperature (20°–30° C.) or from about 9 to 12 months at about 2°–4° C.

Before use it is generally desirable to add a free-radical initiator or catalyst to the liquid or liquefiable composition, e.g., an organic peroxide. A typical practice comprises heating the liquid or flowable composition to a temperature sufficiently high, e.g., about 60°–120° C. (or higher, if necessary), to reduce the viscosity to the point where the catalyst can be most readily and thoroughly admixed therewith. The catalyst, e.g., benzoin peroxide in an amount corresponding to about 4–6% by weight of the polyester resin is then added and mixed thoroughly with the solution. This solution is heated slowly to an elevated temperature, e.g., about 220° C., and thereafter heating is continued at about this temperature until a product is obtained having the particular characteristics desired for a particular service application, e.g., for from about ½ to about 24 hours, specifically about 12 hours.

The resulting product, when cold, withstands a temperature of from −60° to +220° C. without physical deformation. Other similarly prepared samples have withstood temperatures of 240° C. without deformation, or for shorter periods at higher temperatures, e.g., up to about 300° C. The material does not absorb moisture nor does it sublime within the temperature range of −60° C. to +220° C. The tensile strength is of the order of 3000–5000 p.s.i.g., more particularly about 3500–4500 p.s.i.g. The material resists deformation both at room temperature and lower and, also, over a high elevated temperature range under exceedingly high compressive forces. For example, the compressive strength at room temperature is of the order of 15,000–25,000 p.s.i.g., the average usually ranging between about 17,000 and 23,000 p.s.i.g. The surface of the material is highly inert. It is resistant to acids and alkalies. It does not require any oil or grease when it is sliding against another surface. Since its coefficient of friction is very low, it can be used as a bearing or a seal. It is highly insulating electrically, having a high dielectric strength.

A representative sample is tested for the following properties in accordance with their respective A.S.T.M. procedures. The results are as follows:

Test procedures

| (1) Heat distortion temperature | D645–58T |
|---|---|
| (2) Dielectric constant and power factor | D150–59T |
| (3) Volume resistivity | D257–61 |
| (4) Dielectric strength | D149–61 |
| (5) Coefficient of linear thermal expansion | D696–44 |
| (6) Izod impact strength | D256–56 |
| (7) Flexural properties | D790–61 |

Test results

| Test and units: | Test value |
|---|---|
| Heat distortion temperature, 66 p.s.i., ° F. | 140 |
| Dielectric constant— | |
| At 60 cycles per second | 10.20 |
| At $10^6$ cycles per second | 8.23 |
| Power factor— | |
| At 60 cycles per second | 0.033 |
| At $10^6$ cycles per second | 0.037 |
| Volume resistivity, $\times 10^{14}$ ohm-cm. | 8.40 |
| Dielectric strength, short time, volts/mil— | |
| At 20° C. | 55 |
| At 240° C. | 47 |
| Coefficient of linear thermal expansion, $\times 10^{-6}$ per ° C. | 4.66 |
| Izod impact strength, 20° C., ft.-lb./in. of notch | 0.29 |
| Flexural strength, flatwise, p.s.i. | 5,930 |
| Modulus of elasticity in flexure, flatwise, $\times 10^5$ p.s.i. | 7.12 |

Similar results are obtained when about 4–6% of Lupersol DDM, which is comprised of about 60% of methyl ethyl ketone peroxide in dimethyl phthalate, is used in place of 4–6% of benzoin peroxide.

EXAMPLE 2

Example 1 is repeated exactly with the exception that chromic oxide is omitted from the formulation. The final composition has properties that are substantially the same as the composition of Example 1 with the exception that its adhesive or bonding strength to a substrate is materially less. The finely divided composition is useful as a filler for natural and synthetic rubbers, natural and synthetic resins, etc.

EXAMPLE 3

Same as in Example 1 with the exception that 10% of the calcium triphosphate is replaced by an equivalent molar amount of barium triphosphate. Similar results are obtained.

EXAMPLE 4

Same as in Example 1 with the exception that 5% of the calcium triphosphate is replaced by an equivalent molar amount of magnesium triphosphate. Similar results are obtained.

EXAMPLE 5

Essentially the same procedure is followed as described under Example 1 with the exception that 10% of the calcium triphosphate is replaced by an equivalent molar amount of barium triphosphate while an additional 5% of the calcium triphosphate is replaced by an equivalent molar amount of magnesium triphosphate. Similar results are obtained.

EXAMPLE 6

Examples 1 through 5 are repeated exactly with the exception that the 143 parts of molybdenum disulfide is replaced by an equivalent molar amount of barium sulfide. The resulting product, in hardened state, has a higher coefficient of friction than the similar products of Examples 1 through 5, and hence is less satisfactory for use in those applications wherein the lowest possible value for coefficient of friction is important. This property can be improved by using admixtures of molybdenum disulfide and barium sulfide. The value for coefficient of friction generally decreases as the molar amount of molybdenum sulfide with respect to the molar amount of barium sulfide is increased.

EXAMPLE 7

Essentially the same procedure is followed as described in Examples 1 through 6 with the exception that the organic carrier is a poly(organosiloxane), more particularly the poly(organosiloxane) produced and sold by Dow Corning Corporation, Midland, Mich., as Dow Corning's Silastic 881. The proportions of this poly(organosiloxane) and the finely divided heat-reaction product are adjusted to give a liquid composition of approximately the same viscosities as the liquid compositions of Examples 1 through 6.

As with other organic carriers the weight proportions of poly(organosiloxane) and heat-reaction product may be varied between 10:90 and 90:10 depending upon the particular consistency or viscosity wanted in the product before hardening thereof.

Instead of Dow Corning's Silastic 881, substantially the same results can be obtained by using Dow Corning's Silastic 882.

EXAMPLE 8

Same as in Examples 1 through 6 with the exception that the organic carrier is diethylene glycol and the polymerization catalyst is omitted during the period of heating with the heat-reaction product. Similar results are obtained. Substantially the same results are obtained by employing triethylene glycol, tetraethylene glycol, or the various commercially available glycol ethers and esters, etc., in place of diethylene glycol.

EXAMPLE 9

Essentially the same procedure is followed as described in Examples 1 through 6 with the exception that the organic carrier is an organophosphoric acid, more particularly in alkylphosphoric acid (e.g., monomethyl or dimethylphosphoric acid), and specifically an alkylphosphoric acid such as Alcaphose A produced and sold by Monsanto Chemical Company, St. Louis, Mo., and the catalyst is omitted. Instead of Alcaphose A, one can use an equivalent amount of Alcaphose C No. 261–J29, also produced and sold by Monsanto Chemical Company, St. Louis, Mo.

EXAMPLE 10

This example illustrates the characteristics of the products obtained when an admixture of the comminuted starting ingredients employed in making the heat-reaction product are heated in (a) an atmosphere of air and (b) in an atmosphere of nitrogen at a temperature sufficiently high to effect sintering thereof for a period of at least ½ hour.

A master batch or mix was prepared using the following formula, that is, the same formulation employed in Example 1.

| | Parts by wt. |
|---|---|
| Calcium triorthophosphate | 452 |
| Zirconium dioxide | 452 |
| Molybdenum disulfide | 143 |
| Chromic oxide, $Cr_2O_3$ | 93 |

Each of the ingredients in the above formulation had a particle size of 300 mesh and finer. The ingredients were thoroughly mixed together to form a homogeneous admixture. The admixture was then divided into two equal parts to provide Mixes A and B.

Both mixes were heated under identical conditions with the exception that Mix A was heated in an ordinary atmosphere, that is, in an atmosphere of air; while Mix B was heated in an atmosphere of an inert gas, specifically nitrogen. In each case the heating time was about 1500° F. and the time of heating at that temperature was 1 hour.

Sintered, cakeish masses resulted from each of the heat treatments. The sintered mass from Mix A was much darker in color than that from Mix B, the former being almost black in its upper portion at and near the top of the crucible in which it was heated but becoming lighter in color toward the bottom.

The sintered masses resulting from the respective heat treatments were broken up, and each was ground to a powder having a fineness of 300 mesh and finer.

The finely divided, heat-reaction products resulting from each of Mixes A and B were mixed in a blender with a reactive organic carrier, using approximately equal parts by weight of each. The reactive organic carrier employed was a polymerizable polyester resin produced and sold by Hooker Chemical Corporation, Niagara Falls, N.Y., as Durez No. 72.

To each of the respective mixtures of heat-reaction product and organic carrier there was added, and admixed therewith before molding, a polymerization catalyst. Specifically there was used as the catalyst benzoin peroxide in an amount corresponding to 4% by weight of the polyester resin.

Each of the compositions resulting from Mixes A and B were made into small valve plugs, about 3 cm. long and about 2½ cm. in diameter at the widest portion. A mold conforming to the desired configuration of the plug was filled with each composition. The mold was so designed that it functions as a cylinder. The filled mold was pressed under an arbor press for about 12 minutes under a pressure of about 150 p.s.i.g. at ambient temperature to effect partial curing of each composition. The plugs were removed from their molds, and curing was completed by exposure to air at ambient temperature (about 25° C.) for 24 hours.

Results of tests

Plug A made from a composition containing the finely ground, air-sintered, heat-reaction product from Mix A changed appreciably in surface color after being heated; also, its spring tension lessened and deteriorated under this 48-hour heat-treatment in air at 500° F. In fact, the entire plug weakened in its physical characteristics and it was unable to withstand a pressure in excess of 60 p.s.i. Furthermore, when it was tested as a spring and as a diaphragm by cycling in water at 250° F., it failed after 6 cycles.

Plug B, which was made in exactly the same manner as Plug A except that the admixture of inorganic ingredients had been sintered in an atmosphere of an inert gas, specifically nitrogen, was much smoother looking and more glossy than Plug A after each had been completely cured. Its spring tension did not lessen after 300 hours' heating in air at 500° F. Its physical appearance (e.g., color, glossiness and smoothness) did not change under this heat treatment. The plug was able to withstand, undamaged, pressures up to 200 p.s.i. Furthermore, when tested as a spring and as a diaphragm in the same manner as was Plug A, that is, by cycling in 250° F. water, it withstood up to 15,000 cycles without failure.

The following examples illustrate formulations for making other heat-reaction products of the invention that have particular utility when compounded with organic carriers as hereinbefore described. In all cases the time of heating in an electric furnace provided with a nitrogen atmosphere is a total of 1 hour of which about 45 minutes is at the maximum specified temperature (1600° F. or 1800° F.) and about 15 minutes in raising the temperature from about 800° F. to the maximum temperature. The mixing of the starting ingredients, "work-up" of the sintered material and compounding with an organic carrier are essentially the same as in the other examples.

EXAMPLE 11

| | Parts by wt. |
|---|---|
| Aluminum triorthophosphate | 450 |
| Zirconium dioxide | 420 |
| Molybdenum disulfide | 210 |
| Chromic oxide | 120 |

Sintering temperature, maximum, ca. 1600° F.

EXAMPLE 12

| | Parts by wt. |
|---|---|
| Zinc triorthophosphate | 390 |
| Magnesium triorthophosphate | 225 |
| Zirconium dioxide | 405 |
| Molybdenum disulfide | 225 |
| Chromic oxide | 150 |

Sintering temperature, maximum, ca. 1600° F.

EXAMPLE 13

| | Parts by wt. |
|---|---|
| Aluminum triorthophosphate | 600 |
| Antimony triorthophosphate | 300 |
| Zirconium dioxide | 300 |
| Molybdenum disulfide | 150 |
| Chromic oxide | 30 |

Sintering temperature, maximum, ca. 1600° F.

EXAMPLE 14

| | Parts by wt. |
|---|---|
| Ferric pyrophosphate | 750 |
| Zirconium dioxide | 450 |
| Molybdenum disulfide | 150 |
| Chromic oxide | 150 |

Sintering temperature, maximum, ca. 1800° F.

EXAMPLE 15

| | Parts by wt. |
|---|---|
| Magnesium triorthophosphate | 525 |
| Zirconium dioxide | 225 |
| Molybdenum disulfide | 225 |
| Chromic oxide | 150 |

Sintering temperature, maximum, ca. 1600° F.

Other formulations that further illustrate the invention are those which are: (A) exactly the same as in Examples 11 through 15 wherein barium sulfide, BaS, in the same amount by weight, has been substituted for the specified amount of molybdenum disulfide; and (B) exactly the same as in Examples 11 through 15 with the exception that chromic oxide has been omitted from the formulation.

Solid compositions having varying properties to meet particular service applications of the kind herein mentioned by way of example have been produced, following essentially the same procedure described in Example 1, from each of the formulations of Examples 11 through 15, and siimlar formulations containing barium sulfide instead of molybdenum disulfide, and also formulations from which the chromic oxide had been omitted. With each individual formulation at least three different types of organic carriers were used in making the ultimate compositions, viz., a polymerizable organopolysiloxane (Dow Corning's Silastic 881 and/or 882), a polymerizable polyester resin (Durez No. 70, or 92 or 197), and an alkylphosphoric acid (Alcophose A and/or Alcophose C).

When the chromic oxide is omitted from the formulation the resulting compositions, in general, have poorer bonding characteristics (that is, adhere less tenaciously to substrates including metals, e.g., copper, aluminum and others) than when a small amount of chromic oxide is a part of the formulation.

When barium sulfide is substituted for molybdenum disulfide in the individual formulations the resulting compositions, in general, are less heat-resistant and exhibit less surface lubricity than when molybdenum disulfide is employed.

Any of the compositions of the foregoing examples, as well as other unmodified compositions within the scope of this invention, can be modified by incorporating one or more additives or adjuvants at any suitable stage of the process of manufacture or into the unmodified product before hardening thereof in order to modify the properties of the product so that it will better meet the requirements of a particular service application. As examples of such adjuvants may be mentioned finely divided inert pigments such as, for example, titanium dioxide, ferric oxide, etc.; fillers, e.g., asbestos, silica, alumina, etc.; and other modifiers known or suggested for use in painting, spraying, adhesive, sealing, impregnating, laminating, potting, electrically insulating, thermally insulating and other applications including those applications wherein epoxy resins are now commonly used.

It will be understood, of course, by those skilled in the art that the present invention is not limited to the specific ingredients and proportions thereof given in the foregoing examples by way of illustration. Thus, instead of the particular ingredients named in the aforesaid examples, there can be used any of the other ingredients set forth in the specification prior to the examples, and in the ranges of proportions there given. The temperatures, times of heating and other operating conditions also may be varied from those given in the individual examples, for instance as is more broadly set forth in the forepart of this specification.

It will be understood, too, from the foregoing description that the invention includes within its scope heat-curable (i.e., heat-hardenable) compositions comprising (1) at least one heat-reaction product of the kind with which this invention is concerned, and hereinbefore described and defined both broadly and specifically, and (2) a polymerizable organic carrier for said heat-reaction product that is capable of undergoing accelerated polymerization in the presence of a polymerization catalyst, e.g., a free-radical polymerization catalyst. Thus the heat-curable composition can be one wherein the polymerizable organic carrier is, for example, a polymerizable polyester and/or a polymerizable organopolysiloxane, or any other suitable polymerizable material of which numerous examples have been previously given. The scope of the invention also includes products or articles that have been molded, cast, fabricated, shaped, formed or otherwise produced and which comprises the heat-cured compositions obtained by curing (hardening) the hereinbefore-described heat-curable compositions.

The term "organic carrier" as used herein and in the appended claims is intended to include within its meaning such carriers which are reactive, potentially reactive or nonreactive (substantially nonreactive) with the heat-reaction products of the invention. The term also includes within its meaning carriers that have reacted substantially completely with the heat-reaction product.

I claim:
1. A heat-reaction product of (A) at least one member of the group consisting of barium sulfide and molybdenum disulfide, (B) at least one member of the group consisting of the phosphates of aluminum, antimony, barium, calcium, iron, magnesium and zinc, and (C) at least one member of the group consisting of the dioxides of hafnium, thorium, uranium and zirconium.

2. A heat-reaction product as in claim 1 wherein the member of the group of (A) is molybdenum disulfide; the phosphate of (B) is calcium phosphate; and the dioxide of (C) is zirconium dioxide.

3. A heat-reaction product as in claim 2 wherein the relative weight proportions of the starting ingredients are:
 (A) from about 100 to about 225 parts molybdenum disulfide;
 (B) from about 400 to about 600 parts calcium phosphate; and (C) from about 225 to about 600 parts zirconium dioxide.

4. A heat-reaction product as in claim 1 which additionally includes (D) chromic oxide among the starting components from which the said product is formed.

5. A heat-reaction product as in claim 2 which additionally includes (D) chromic oxide among the starting components from which the said product is formed.

6. A heat-reaction product as in claim 3 which additionally includes (D) from about 30 to about 150 parts chromic oxide among the starting components from which the said product is formed.

7. The method of producing an inorganic heat-reaction product which comprises heating an admixture of the ingredients defined under (A), (B), and (C) in claim 1, said ingredients being in comminuted form, in a non-oxidizing atmosphere at a maximum temperature within the range of from about 1300° F. to about 1800° F. for a period of at least about ½ hour.

8. The method of producing an inorganic heat-reaction product which comprises heating an admixture of the ingredients defined under (A), (B), and (C) in claim 1, said ingredients being in comminuted form, in an atmosphere of nitrogen at a maximum temperature within the range of from about 1300° F. to about 1800° F. for a period of at least about ½ hour.

9. The method as in claim 8 which additionally includes (D) chromic oxide among the starting components from which the said product is formed.

10. A composition comprising (1) the heat-reaction product defined in claim 1 and (2) an organic carrier for said heat-reaction product.

11. A composition as in claim 10 wherein the organic carrier is a polyester.

12. A composition as in claim 10 wherein the organic carrier is a polyethylene glycol.

13. A composition as in claim 10 wherein the organic carrier is an alkyl-substituted phosphoric acid.

14. A composition as in claim 10 wherein the organic carrier is an organopolysiloxane.

15. A composition comprising (1) the heat-reaction product defined in claim 3 and (2) an organic carrier for said heat-reaction product.

16. A composition comprising (1) the heat-reaction product defined in claim 3 and (2) an organic carrier for said heat-reaction product.

17. A composition comprising (1) the heat-reaction product defined in claim 4 and (2) an organic carrier for said heat-reaction product.

18. A composition comprising (1) the heat-reaction product defined in claim 5 and (2) an organic carrier for said heat-reaction product.

19. A composition comprising (1) the heat-reaction product defined in claim 6 and (2) an organic carrier for said heat-reaction product.

20. A heat-curable composition comprising (1) the heat-reaction product defined in claim 1 and (2) a polymerizable organic carrier for said heat-reaction product that is capable of undergoing accelerated polymerization in the presence of a polymerization catalyst.

21. A heat-curable composition as in claim 20 wherein the polymerizable organic carrier is a polymerizable polyester.

22. A heat-curable composition as in claim 20 wherein the polymerizable organic carrier is a polymerizable organo-polysiloxane.

23. A product comprising the heat-cured composition of claim 20.

References Cited

UNITED STATES PATENTS 3,132,033   5/1964   Tiede _____ 252—301.1 X
3,189,470   6/1965   Long _____ 106—63 X LELAND A. SEBASTIAN, *Primary Examiner.*